Oct. 27, 1942.        R. MAYER        2,299,837
POST BRACKET
Filed May 5, 1941

INVENTOR
RICHARD MAYER
BY
ATTORNEY

Patented Oct. 27, 1942

2,299,837

UNITED STATES PATENT OFFICE 2,299,837

POST BRACKET

Richard Mayer, New Rochelle, N. Y., assignor to Masterbilt Products Corporation, New York, N. Y., a corporation of New York Application May 5, 1941, Serial No. 391,944

3 Claims. (Cl. 248—229)

This invention relates generally to brackets. More particularly, my invention relates to a certain new and useful improvement in brackets especially, though not exclusively, adapted for mounting a cigarette or other container upon a steering or other post and has for its primary object the provision of a bracket of the type and for the purpose stated which is simple in structure, which may be cheaply and economically manufactured, which is durable in construction, which may be easily and conveniently installed upon an automobile steering post or the like, which comprises few readily adjustably assembled parts for secure clamping engagement upon posts of varying shape and diametral size, and which is highly efficient in the performance of its stated functions.

And with the above and other objects in view, my invention resides in the novel features of form, construction, arrangement, and combination of parts presently described and pointed out in the claims.

In the accompanying drawing—

Figure 1:
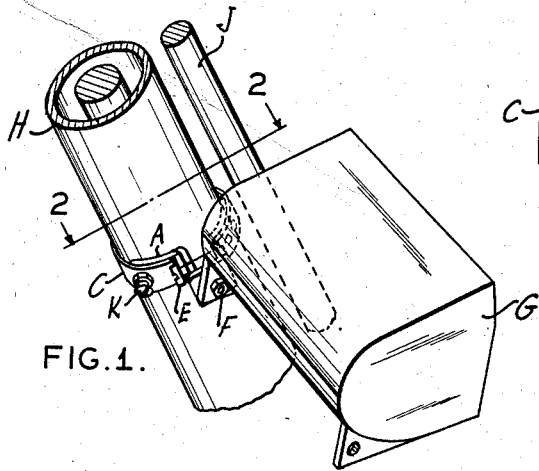
Figure 1 is a perspective view illustrating a post bracket of my invention in clamped or installed position for mounting a cigarette container upon an automotive steering-wheel post, the latter being fragmentally shown.
Figure 4:
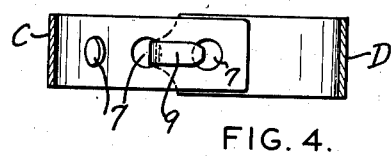
Figure 4 is a fragmentary sectional view of the bracket, taken approximately along the line 4—4, Figure 2.

Referring now in more detail and by reference characters to the drawing, which illustrates a preferred embodiment of my invention, the bracket includes as its principal parts a first rigid arm A, a companion or second rigid arm B, a first bendable or flexible preferably metallic strap C, and a second or companion bendable or flexible also preferably metallic strap D.

The arm A, in turn, comprises a body-portion $a$ longitudinally of suitable curvature or arcuate contour and of suitable circumferential length and formed preferably integrally at its one end with a radially projecting extension $a'$ suitably transversely apertured, as at 1, for freely accommodating the shank 2 of an arm clamping or securing screw E, for purposes presently fully appearing.

The arm B similarly comprises a body-portion $b$ longitudinally of suitable curvature or arcuate contour and of a circumferential length somewhat greater than that of the body-portion $a$ of arm A and likewise formed preferably integrally at one end with a radially projecting extension $b'$ tapped, as at 3, for threaded connection with the shank 2 of screw E, the extension $b'$, in turn, being preferably integrally and right-angularly formed at its free end with a suitably elongated plate-section or platform $b^2$ for transversely accommodating and seating the shank 4 of a container mounting member F formed or provided preferably integrally at its one or inner end with a preferably out-of-round or rectangular head 5 for snugly impinging or abutting the arm extension $b$ for securely retaining the member or stud F from rotative movement, the stud-shank 4 being presented outwardly for suitable connection and supporting engagement with the particular container G, substantially as shown.

Strap C is riveted or otherwise permanently fixed at one end, as at 6, flatwise to and upon the body-portion $a$ of arm A and is of any suitable length to flexibly extend partially in embracing relation about a post H with which the bracket is to be employed, strap C being formed longitudinally with a series of suitably spaced openings 7.

Strap D is riveted or otherwise permanently fixed at one end, as at 8, flatwise to and upon the body-portion $b$ of arm B and is of such length relatively to the strap C as to flexibly extend both partially in embracing relation about the post H and overlappingly upon the free end-portion of strap C, the strap D being formed or provided at its free end with a bendable grip-projection or finger 9 for gripping engagement with the strap C at a selected opening 7.

Accordingly, in use and practice, either one or the other of the straps C or D may be readily and conveniently flexibly threaded intermediate the post H and its present-day closely disposed gear-shift shaft or rod J, the strap D at its free end disposed overlappingly upon the strap C, and the finger 9 of strap D then bendably projected endwise through a selected opening 7 and reversely under the strap C, as shown. A screw E is then threadedly engaged with the arm-extensions $a$ and $b$, and the arms A, B, relatively shifted by and under their engagement with the screw E for firmly and rigidly clamping the bracket upon the post H for supporting the container G upon the stud F in position conveniently accessible to the automobile driver.

Figure 2:
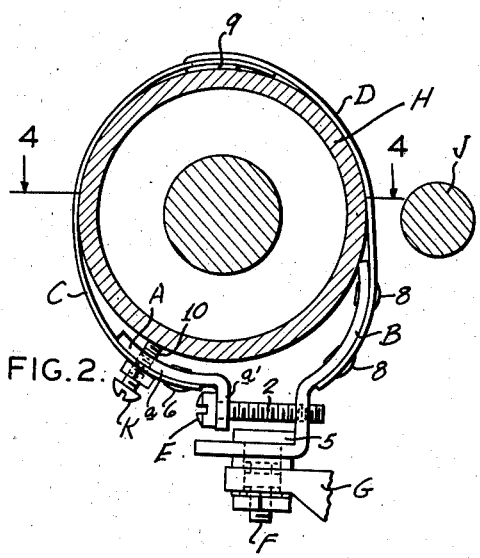
Figure 2 is an end view of the bracket, taken approximately along the line 2—2, Figure 1.
Figure 5:
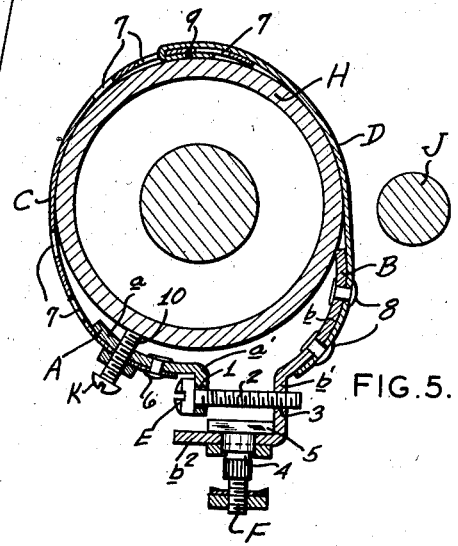
Figure 5 is a sectional view of the bracket and post, taken approximately on the line 5—5, Figure 3.
Figure 3:
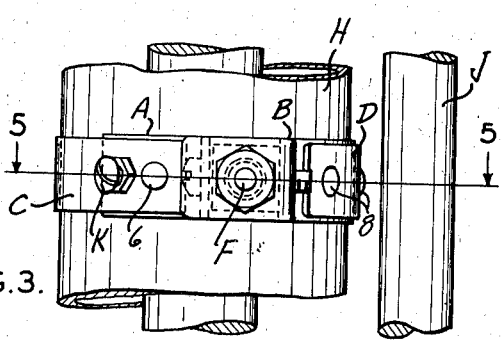
Figure 3 is an elevational view of the bracket in installed position upon a steering post, as in Figure 1.
Figure 6:
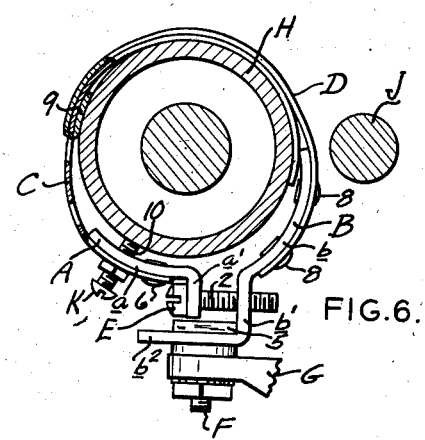
Figure 6 is an end view of the bracket adjusted for, and in clamped engagement with, an automotive steering post of reduced diametral size.

Under such engagement between the bracket and the post, the bent finger 9 will be clamped between the bracket and post and the straps C, D, thereby securely held against separation, it being, of course, understood that, as shown in Figures 2 and 6, the finger 9 may be engaged with any selected opening 7 for adjustably mounting the bracket and container upon posts or columns of different diametral sizes.

Preferably also a supplemental stud K is threaded upon the arm A for endwise impinging engagement at its shank 10 with the bracket-embraced post H for forcing the arm A away from the post H for adjustably tightening the grip of the straps C, D, upon the post H.

The bracket fulfills in every respect the objects stated, and it is to be understood that changes and modifications in the form, construction, arrangement, and combination of the several parts of the bracket may be made and substituted for those herein shown and described without departing from the nature and principle of my invention.

Having thus described my invention, what I claim and desire to secure by Letters Patent is:

1. A supporting bracket adapted to be secured to a post including, in combination, a pair of substantially rigid companion clamping arms, means for encircling a post comprising a first strap connected at one end to and extending from one of said clamp arms and provided with a plurality of longitudinally spaced openings, and a second strap connected at one end and extending from the second of said clamp arms and having at its free end a hook extension adjustably receivable in a selected one of said openings, and means engaging said clamp arms for drawing the same together thereby tightening the post encircling means upon the post and securely holding the hook end of said second strap within the selected opening of said first strap.

2. A supporting bracket adapted to be secured to a post including, in combination, a pair of companion substantially non-yieldable clamping arms, means for encircling a post comprising a first flexible strap connected at one end to one of said arms and having its free end extending to a length for partially encircling the particular post, said strap being provided through its free end with a longitudinal series of adjusting openings, and a second strap connected at one end to the other arm having its free end extending for a sufficient length to partially embrace the particular post and to overlie upon the outer face of the first strap having the series of adjusting openings therethrough, the second strap being formed at its end with a readily bendable extension received through a selected opening and bent inwardly and over against the inner side of the first flexible strap thereby forming a hook, and means having engagement with said clamping arms for drawing said arms together and consequently tensioning said flexible strap portions in post encircling relation with the bendable extension having its hook end bearing against the post and consequently held against separation.

3. A supporting post bracket including, in combination, a pair of substantially non-yielding companion clamping arms, means for encircling a post comprising a first strap connected at one end to and extending from one of said clamp arms and provided with a plurality of longitudinally spaced openings, and a second strap connected at one end and extending from the second of said clamp arms and having at its free end a hook extension adjustably receivable in a selected one of said openings, means engaging said clamp arms for drawing the same together thereby tightening the post encircling means upon the post and securely holding the hook end of said second strap within the selected opening of said first strap, an extension on one of said clamping arms, and means comprising a stud having engagement with said extension for securing a supporting structure thereto.

RICHARD MAYER.